US012726342B2

(12) United States Patent
Kon et al.

(10) Patent No.: US 12,726,342 B2
(45) Date of Patent: Sep. 1, 2026

(54) SYSTEMS AND METHODS FOR PRACTICAL QUANTUM POSITION-BASED KEY EXCHANGE

(71) Applicant: JPMORGAN CHASE BANK, N.A., New York, NY (US)

(72) Inventors: Wen Yu Kon, Singapore (SG); Ignatius William Primaatmaja, Singapore (SG); Kaushik Chakraborty, Singapore (SG); Ci Wen Lim, Singapore (SG); Marco Pistoia, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 43 days.

(21) Appl. No.: 18/980,518

(22) Filed: Dec. 13, 2024

(65) Prior Publication Data

US 2026/0189377 A1 Jul. 2, 2026

(51) Int. Cl.
*H04L 9/08* (2006.01)

(52) U.S. Cl.
CPC .......... *H04L 9/0858* (2013.01); *H04L 9/0855* (2013.01)

(58) Field of Classification Search
None
See application file for complete search history.

(56) References Cited

U.S. PATENT DOCUMENTS

2012/0195597 A1* 8/2012 Malaney ............... H04W 12/10 398/115
2016/0359623 A1* 12/2016 Unruh ................... H04L 9/3271
2023/0034274 A1* 2/2023 M T ........................... H04L 9/14
2025/0323804 A1* 10/2025 Sehrawat .............. H04L 9/3278

OTHER PUBLICATIONS

Buhrman, Harry et al., "Position-Based Quantum Cryptography: Impossibility and Constructions", arXiv:1009.2490, Oct. 18, 2010, pp. 1-24. (Year: 2010).*
Cowperthwaite, George et al., "Towards practical quantum position verification", arXiv:2309.10070v2, Nov. 12, 2023, pp. 1-11. (Year: 2023).*

* cited by examiner

*Primary Examiner* — Michael Pyzocha
(74) *Attorney, Agent, or Firm* — GREENBERG TRAURIG LLP

(57) ABSTRACT

A method may include: a third-party receiving a claimed position from a prover; the third-party and the prover exchanging quantum information; the third-party generating a third-party raw key based on the quantum information; the prover generating a prover raw key based on the quantum information; the third-party and the prover performing classical post-processing based on the raw keys; the third-party sending, a position verification request with the claimed position to a first verifier and a second verifier; the first verifier and the second verifier sending classical messages and a quantum system to the prover to arrive at a target time; the prover measuring the quantum system using the classical messages; the prover sending responses to the verifiers; the verifiers validating the responses and confirming that the responses were received within an expected time window; and the first verifier informing the third-party of a result of the validation.

20 Claims, 5 Drawing Sheets

SYSTEMS AND METHODS FOR PRACTICAL QUANTUM POSITION-BASED KEY EXCHANGE

BACKGROUND OF THE INVENTION

1. Field of the Invention

Embodiments relate to systems and methods for practical quantum position-based key exchange.

2. Description of the Related Art

The physical location, or position, of an entity, can serve as a useful credential that is difficult to impersonate. For instance, verifying that a server for a trusted entity that one is communicating with is located within the trusted entity's data center allows one to confidently certify the identity of the server without having to pre-share any secrets. Moreover, position-based identification can provide anonymity, for instance allowing a client to be granted access to a server based on the location (e.g., within an office), without requiring the client to reveal his/her identity.

Without quantum communication, classical position verification or position-based key exchange protocol requires the assumption of the bounded retrieval model, which essentially acts as a limit to the amount of classical information the adversary can store. The use of quantum communication affords the protocol properties that are not achievable with classical communication alone.

Having a bound on the classical memory size is an impractical assumption today, where commercial devices such as hard drives can store data beyond terabyte sizes. Using quantum communication allows for the adversary to have unbounded classical memory, but requires them to have bounded quantum entanglement. Since quantum information cannot be easily stored, at least in the near-term, this assumption on bounded quantum storage is more reasonable.

Further, the quantum communication steps provide an avenue for information-theoretic secure key exchange-similar to quantum key distribution. This is not possible in the classical regime, without limits placed on the classical memory sizes of the adversaries.

SUMMARY OF THE INVENTION

Systems and methods for practical quantum position-based key exchange are disclosed. In one embodiment, a method may include: (1) receiving, by a third-party electronic device, a claimed position from a prover electronic device; (2) exchanging, by the third-party electronic device and the prover electronic device, quantum information; (3) generating, by the third-party electronic device, a third-party raw key based on the quantum information; (4) generating, by the prover electronic device, a prover raw key based on the quantum information; (5) performing, by the third-party electronic device and the prover electronic device, classical post-processing based on the third-party raw key and the prover raw key; (6) sending, by the third-party electronic device, a position verification request with the claimed position to a first verifier electronic device and a second verifier electronic device; (7) sending, by the first verifier electronic device and the second verifier electronic device, classical messages and a quantum system to the prover electronic device to arrive at a target time; (8) measuring, by the prover electronic device, the quantum system using the classical messages; (9) sending, by the prover electronic device, responses to the first verifier electronic device and the second verifier electronic device; (10) validating, by the first verifier electronic device and the second verifier electronic device, the responses and confirming that the responses were received within an expected time window; and (11) informing, by the first verifier electronic device, the third-party electronic device, of a result of the validation.

In one embodiment, the step of exchanging, by the third-party electronic device and the prover electronic device, quantum information may include: preparing, by the third-party electronic device and using a third-party quantum device, a plurality of first quantum systems using a quantum key distribution (QKD) basis choice; sending, by the third-party electronic device, the plurality of first quantum systems to the prover electronic device; and measuring, by the prover electronic device and using a prover quantum device, the plurality of first quantum systems using a prover basis choice.

In one embodiment, the step of performing, by the third-party electronic device and the prover electronic device, classical post-processing based on the third-party raw key and the prover raw key may include: sending, by the prover electronic device, a prover classical message to the third-party electronic device; sending, by the third-party electronic device, a third-party classical message to the prover electronic device; performing, by the third-party electronic device and the prover electronic device, sifting, error correction, and parameter estimation based on the prover classical message and the third-party classical message; sending, by the third-party electronic device, a hash of the prover classical message; and generating, by the prover electronic device, a quantum position verification (QPV) action choice, wherein the QPV action choice is based on the hash of the prover classical message being correct.

In one embodiment, the method may also include: generating, by the third-party electronic device, a third-party QKD indicator, wherein the third-party QKD indicator indicates whether a key exchange will fail; and sending, by the third-party electronic device, the third-party QKD indicator to the prover electronic device.

In one embodiment, the step of sending, by the first verifier electronic device and the second verifier electronic device, classical messages and a quantum system to the prover electronic device to arrive at a target time may include: generating, by the first verifier electronic device, a first bitstring, a second bitstring; sending, the first verifier electronic device, the first bitstring, the second bitstring, and the target time to a second verifier electronic device; preparing, by the first verifier electronic device, the quantum system; sending, by the first verifier electronic device, the quantum system to the prover electronic device; and sending, by the second verifier electronic device, the second bitstring to the prover electronic device, wherein the first bitstring and the second bitstring are sent to arrive at the claimed position at the target time.

In one embodiment, the step of measuring, by the prover electronic device, the quantum system using the classical messages may include: measuring, by the prover electronic device, the quantum system using the first bitstring and the second bitstring, resulting in measurement outcomes; and returning, by the prover electronic device, the measurement outcomes to the first verifier electronic device and the second verifier electronic device.

In one embodiment, the measurement outcomes comprise a random bit value in response to the QPV action choice indicating that the hash of the prover classical message is incorrect.

In one embodiment, the expected time window is based on the claimed position of the prover electronic device.

In one embodiment, the validation fails in response to the response being invalid or the response being received outside of the expected time window.

In one embodiment, the method may also include: performing, by the prover electronic device and the third-party electronic device, privacy amplification, resulting in a prover secret key and a third-party secret key.

According to another embodiment, a system may include: a first verifier electronic device executing a first verifier computer program; a second verifier electronic device executing a second verifier computer program; a prover electronic device executing a prover computer program; and a third-party electronic device executing a third-party computer program. The third-party computer program may be configured to receive a claimed position from a prover computer program; the third-party computer program and the prover computer program are configured to exchange quantum information; the third-party computer program may be configured to generate a third-party raw key based on the quantum information; the prover computer program may be configured to generate a prover raw key based on the quantum information; the third-party computer program and the prover computer program are configured to perform classical post-processing based on the third-party raw key and the prover raw key; the third-party computer program may be configured to send a position verification request with the claimed position to the first verifier computer program and the second verifier computer program; the first verifier computer program and the second verifier computer program are configured to send classical messages and a quantum system to the prover computer program to arrive at a target time; the prover computer program may be configured to measure the quantum system using the classical messages; the prover computer program may be configured to send responses to the first verifier computer program and the second verifier computer program; the first verifier computer program and the second verifier computer program are configured to validate the responses and confirming that the responses were received within an expected time window; and the first verifier computer program may be configured to inform the third-party computer program of a result of the validation.

In one embodiment, the third-party computer program and the prover computer program are configured to exchange quantum information by: the third-party computer program preparing, using a third-party quantum device, a plurality of first quantum systems using a quantum key distribution (QKD) basis choice; the third-party computer program sending the plurality of first quantum systems to the prover computer program; and the prover computer program measuring, and using a prover quantum device, the plurality of first quantum systems using a prover basis choice.

In one embodiment, the third-party computer program and the prover computer program are configured to perform classical post-processing based on the third-party raw key and the prover raw key by: the prover computer program sending a prover classical message to the third-party computer program; the third-party computer program sending a third-party classical message to the prover computer program; the third-party computer program and the prover computer program performing sifting, error correction, and parameter estimation based on the prover classical message and the third-party classical message; the third-party computer program sending a hash of the prover classical message; and the prover computer program generating a quantum position verification (QPV) action choice, wherein the QPV action choice is based on the hash of the prover classical message being correct.

In one embodiment, the third-party computer program may be configured to generate a third-party QKD indicator, wherein the third-party QKD indicator indicates whether a key exchange will fail; and the third-party computer program may be configured to send the third-party QKD indicator to the prover computer program.

In one embodiment, the first verifier computer program and the second verifier computer program are configured to send the classical messages and the quantum system to the prover computer program to arrive at a target time by: the first verifier computer program generating a first bitstring, a second bitstring; the first verifier computer program sending the first bitstring, the second bitstring, and the target time to the second verifier computer program; the first verifier computer program preparing the quantum system; the first verifier computer program sending the quantum system to the prover computer program; and the second verifier computer program sending the second bitstring to the prover computer program, wherein the first bitstring and the second bitstring are sent to arrive at the claimed position at the target time.

In one embodiment, the prover computer program may be configured to measure the quantum system using the classical messages by: the prover computer program measuring the quantum system using the first bitstring and the second bitstring, resulting in measurement outcomes; and the prover computer program returning the measurement outcomes to the first verifier computer program and the second verifier computer program.

In one embodiment, the measurement outcomes comprise a random bit value in response to the QPV action choice indicating that the hash of the prover classical message is incorrect.

In one embodiment, the expected time window is based on the claimed position of the prover computer program.

In one embodiment, the validation fails in response to the response being invalid or the response being received outside of the expected time window.

In one embodiment, the prover computer program and the third-party computer program are configured to perform privacy amplification, resulting in a prover secret key and a third-party secret key.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate to systems and methods for practical quantum position-based key exchange.

The disclosure of U.S. patent application Ser. No. 18/955,677, filed Nov. 21, 2024, is hereby incorporated, by reference, in its entirety.

Known protocols for secure quantum position verification can only achieve a single task: verify the position of a single party. Embodiments may build upon the secure quantum position verification protocol to achieve a different cryptographic task-position-based key exchange. In addition to using the quantum communication in quantum position verification to verify the location of a party, embodiments may use the same communication to exchange keys between parties. The exchange of a key with a party with a known position (with the known position acting as a certification of the party's identity) allows further tasks such as the exchange of secret communications or authenticating messages, significantly extending the application beyond simply certifying the position.

Figure 1:
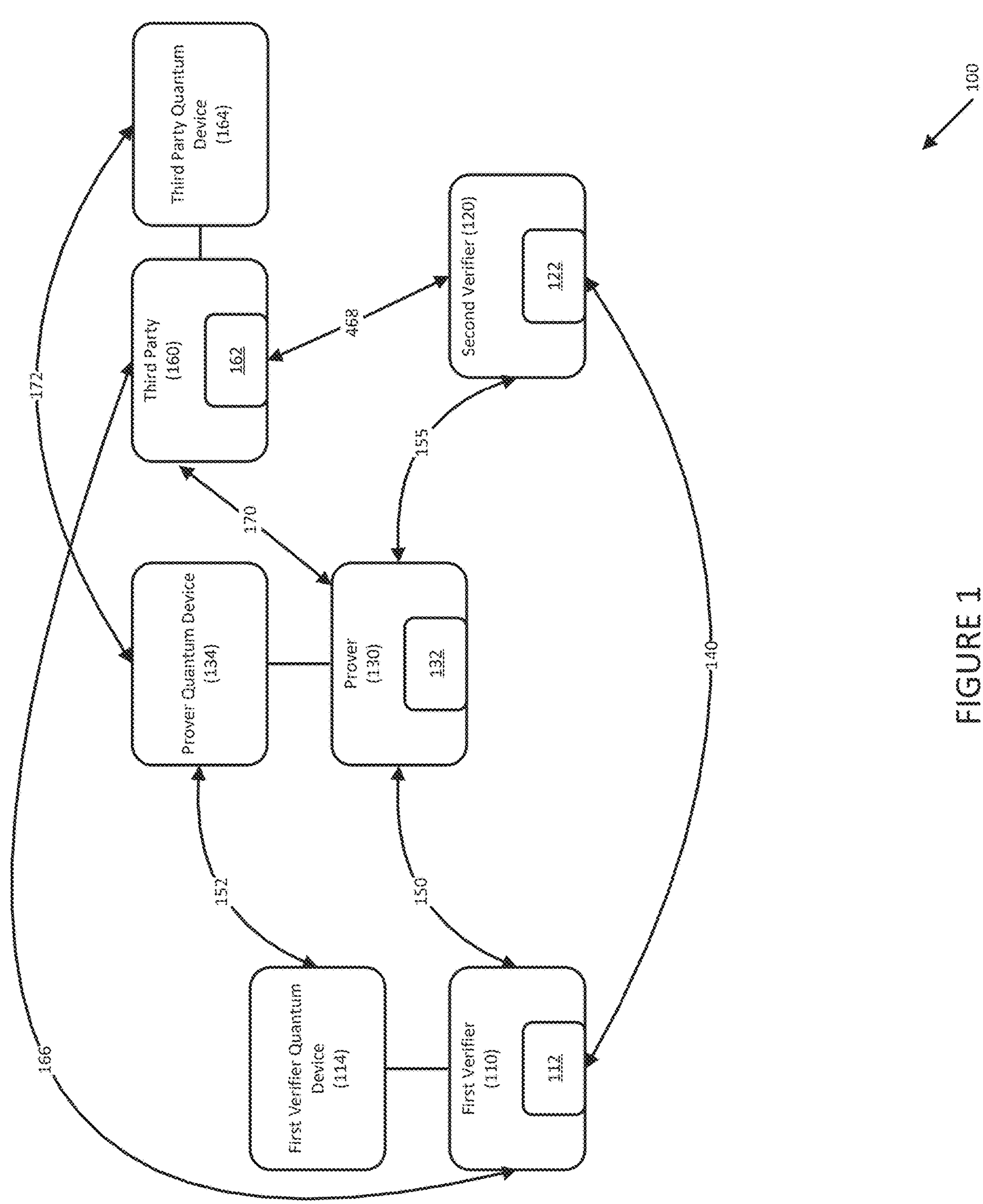
FIG. 1 illustrates a system for practical quantum position-based key exchange according to an embodiment.

Referring to FIG. 1, a system for practical quantum position-based key exchange is disclosed according to an embodiment. System 100 may include first verifier 110 and second verifier 120. In one embodiment, verifiers 110 and 120 may be electronic devices, such as servers, computers, etc. Verifiers 110 and 120 may be at known geographical locations, such as data centers or satellites.

First verifier 110 may execute first verifier computer program 112, and second verifier 120 may execute second verifier computer program 122.

First verifier 110 and second verifier 120 may communicate via secure private communication channel 140. For example, secure private communication channel 140 may include a fiber channel, a satellite link, a virtual private network (VPN), etc.

First verifier 110 may have access to first verifier quantum device 114, such as a BB84 source, an entanglement source (e.g., a spontaneous parametric down conversion source), etc.

Prover 130 may be a classical electronic device, such as a server, a computer, etc., that has access to prover quantum device 134, such as a quantum measurement device, such as photon-number resolving detectors, BB84 measurement devices, etc. Prover 130 may seek to prove its location (i.e., location P) to first verifier 110 and second verifier 120. Prover 130 may be substantially colinearly located with first verifier 110 and second verifier 120.

Prover may execute prover computer program 132.

First verifier 110 and second verifier 120 may communicate with prover 130 using first communication channel 150 and second communication channel 155, respectively. First communication channel 150 and second communication channel 155 may be any suitable classical communication channel, preferably with low latency.

First communication channel 150 and second communication channel 155 may also support one-way authentication, where prover 130 may authenticate messages originating from the first verifier 110 and second verifier 120, respectively.

First verifier quantum device 114 and prover quantum device 134 may communicate via quantum supported communication channel 152, which may be any suitable communication channel that supports quantum communications, such as a direct fiber connection, a satellite link, etc.

System 100 may further include third-party 160. Third-party 160 may be a classical electronic device, such as a server, a computer, etc., that has access to quantum device 164.

Third-party 160 may communicate with prover 130 using classical commutation channel 170, which may be similar to communication channel 150. Third-party quantum device 164 may communicate with prover quantum device 134 via quantum supported communication channel 172, which may be any suitable communication channel that supports quantum communications, such as a direct fiber connection, a satellite link, etc.

Third-party 160 may execute third-party computer program 162.

Third-party 160 may communicate with first verifier 110 via classical commutation channel 166, and with second verifier 120 via classical commutation channel 168. Classical communication channels 166 and 168 may be secure communication channels.

Third-party 160 and prover 130 may want to exchange secret keys with each other (either may initiate the protocol). To certify the identity of prover 130 (i.e., for third-party 160 to ensure that it exchanges key with prover 130 and not anyone else), third-party 160 may enlist the help of first verifier 110 and second verifier 120 to certify the location of prover 130 (i.e., using location as credential).

Figure 2A:
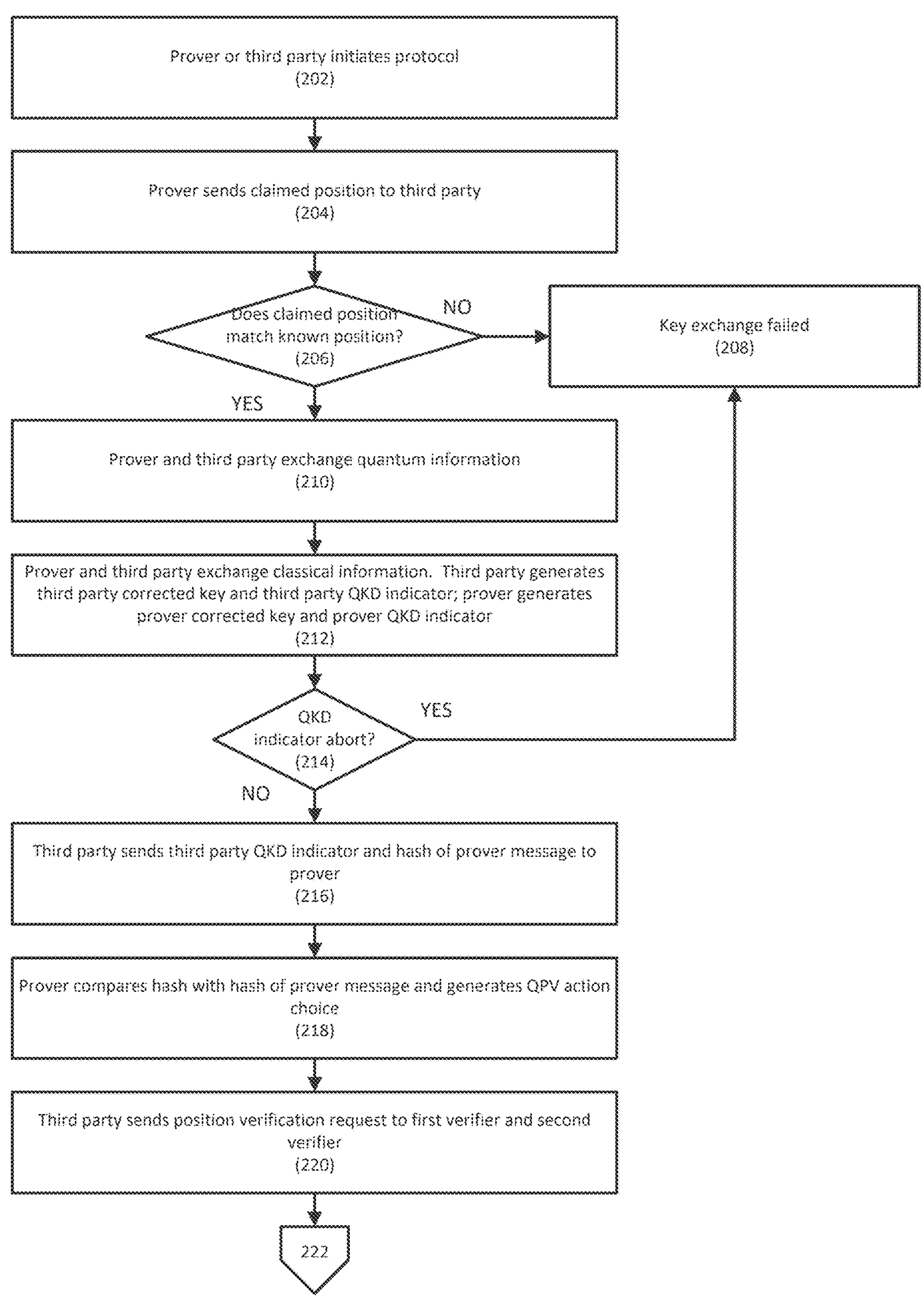
FIGS. 2A, 2B, and 2C illustrate a method for practical quantum position-based key exchange according to an embodiment.
Figure 2B:
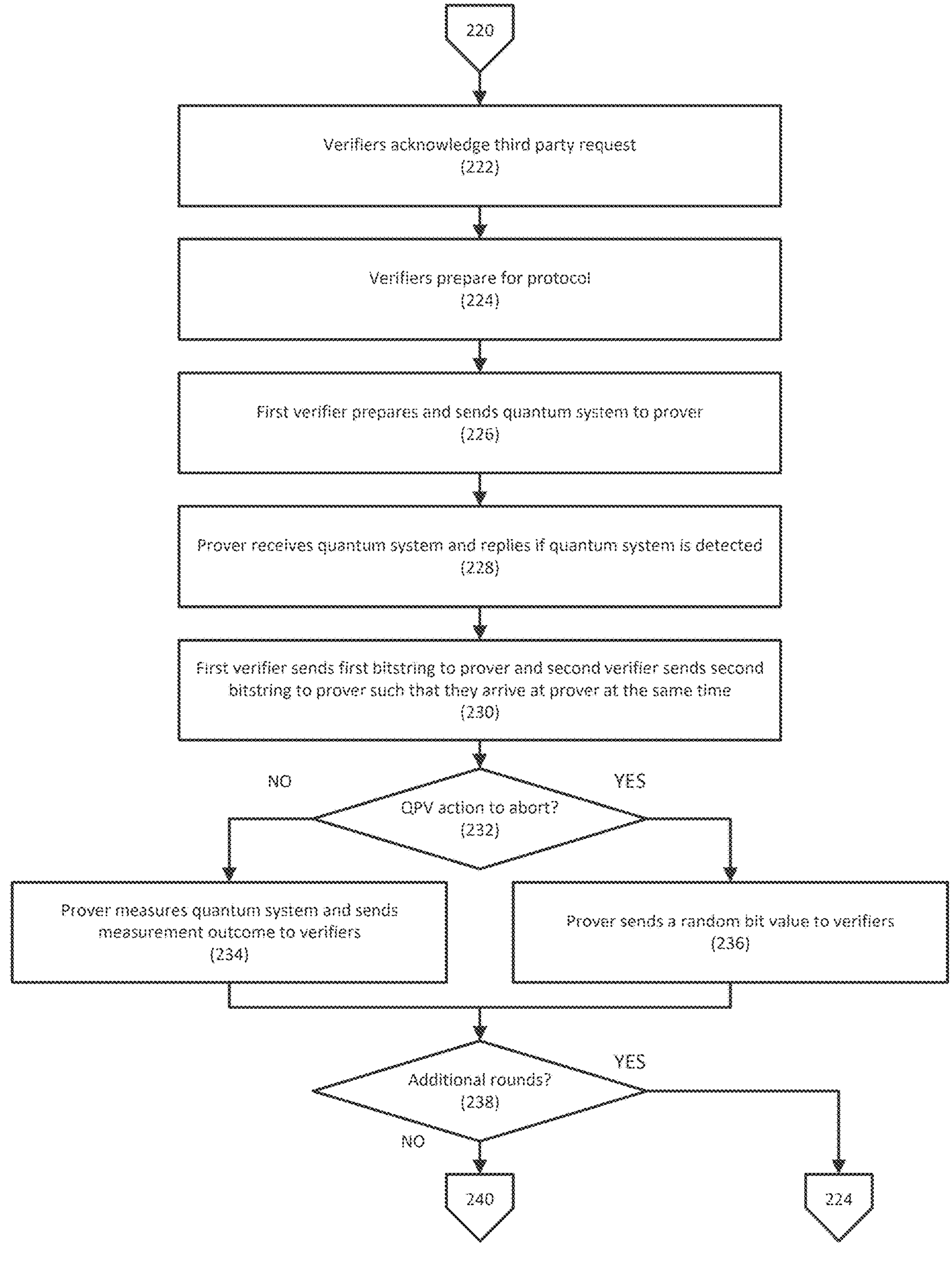
Figure 2C:
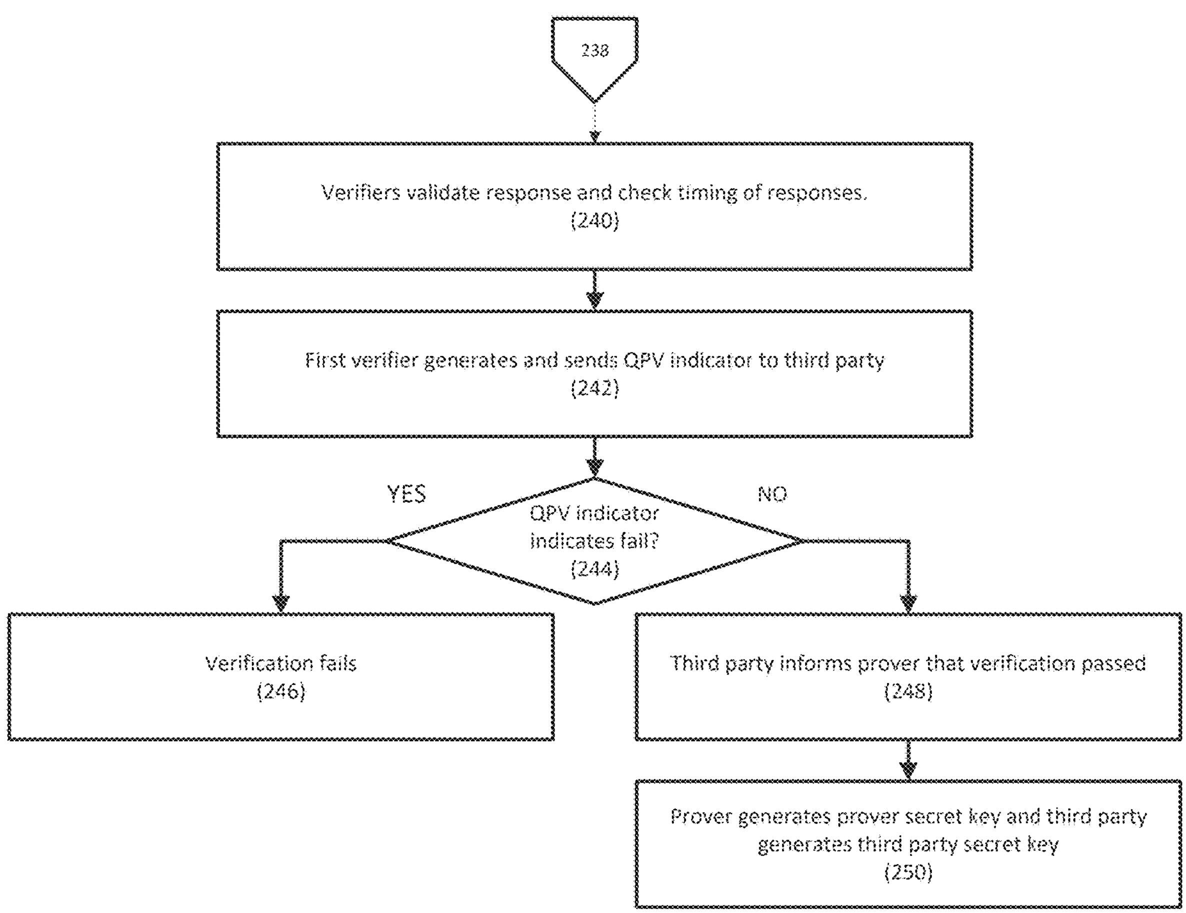

Referring to FIGS. 2A, 2B, and 2C, a method for practical quantum position-based key exchange is disclosed according to an embodiment.

In step 202, a prover or a third-party may initiate a quantum position-based key exchange protocol. For example, the initiating party may send a hello message to the target party (e.g., from the prover to the third-party) to begin the protocol, and the target party may respond with a hello message to indicate that it is ready to begin the protocol.

In step 204, the prover may send its claimed position, P, to the third-party. The claimed position, P, is the location that the third-party can use to verify the prover's identity.

In step 206, the third-party may optionally check if the claimed position P matches with privately or publicly available information of the prover's known locations. For example, if the prover has one or more known physical location, the third-party may verify that the claimed position P matches one of the known physical locations.

If it does not, in step 208, the key exchange may fail.

In step 210, the prover and the third-party may exchange quantum information. For example, the third-party can randomly select an n-bit bitstring as the third-party QKD basis choice θ and an n-bit bitstring as the QKD bit values a. The third-party prepares n quantum systems, each in a BB84 state using the corresponding third-party QKD basis choice $\theta_i$ and QKD bit values $a_i$, and sends the QKD quantum systems to the prover. The prover randomly selects an n-bit bitstring as the prover QKD basis choice θ' and measures the n quantum systems in the selected basis, and the measurement outcomes b form an n-bit string. The third-party generates a third-party raw key $S_T$ from QKD bit values a and the prover generates a prover raw key $S_P$ from the measurement outcomes b. The third-party raw key $S_T$ and the prover raw key $S_P$ may be used in error correction, discussed below.

In general, raw keys are bitstrings generated after the quantum process but before classical post-processing. The third-party and prover raw keys are correlated and partially known to any eavesdropper, and classical post-processing steps (i.e., sifting, error correction) correct the keys so that they match and make them secret against the adversary (i.e., privacy amplification).

In step 212, the prover and the third-party may perform classical post-processing. For example, the prover and the third-party may exchange classical messages, which include third-party messages $M_T$ sent from the third-party to the prover through a one-way authenticated channel and prover messages $M_P$ sent from the prover to the third-party. These messages may include information necessary for sifting, error correction and parameter estimation, such as the basis choice and syndrome. The third-party and prover may use these messages to perform sifting, error correction and parameter estimation. At the end of the step, the third-party may generate third-party corrected key $$S'_T$$

from the messages and the third-party raw key, and a third-party QKD indicator $D_T$ to indicate if the third-party parameter estimation has $$S'_P$$

passed. The prover may generate a prover corrected key from the messages and the prover raw key, and a prover QKD indicator $D_P$ to indicate if the prover parameter estimation has passed.

For example, the third-party may send the third-party QKD basis choice θ to the prover through a one-way authenticated channel and the prover may send prover QKD basis choice θ' to the third-party. The QKD basis choice describes the choice of the quantum measurement and quantum state preparation. For example, the preparation of a quantum system with a polarization quantum state can be in the rectilinear basis, to prepare the quantum system either in the horizontal or vertical polarization, or in the circular basis, to prepare the quantum system either in the left-circular or right-circular polarization.

The prover and third-party may independently perform sifting on their respective raw keys, keeping the raw keys only for rounds where their basis choice matches, in turn generating third-party sifted key $S_{T,sift}$ and prover sifted key $S_{P,sift}$. Furthermore, the third-party may send a syndrome computed from third-party sifted key $$syn = f_{syn}^{enc}(S_{T,sift})$$

and a hash $h_1(S_{T,sift})$ to the prover through a one-way authenticated channel. The prover may compute a prover corrected key from the syndrome received and prover sifted key, $$S'_P = f_{syn}^{dec}(syn, S_{P,sift})$$

while the third-party may set the third-party sifted key as the third-party corrected key.

The prover may compute a hash of prover corrected key $$h_1(S'_P)$$

and may compare it with the received hash. If the hashes match, the prover may set a prover QKD indicator, $D_P$, to a first value (e.g., 1); otherwise, the prover may set $D_P$ to a second value (e.g., 0). The prover may randomly select part of the prover sifted key and may send it to the third-party. Based on the received part of prover sifted key and third-party sifted key, the third-party may estimate an error rate. If this error rate falls within a threshold, the third-party may set a third-party QKD indicator, $D_T$, to first value (e.g., 1); otherwise, the third-party may set $D_T$ to a second value (e.g., 0).

In step 214, the third-party may check if third-party QKD indicator indicates that the third-party parameter estimation has passed. If third-party parameter estimation has failed, in step 208, the key exchange will fail. If third-party parameter estimation has passed, in step 216, the third-party may send the third-party QKD indicator and a hash of the prover message to the prover.

In step 218, the prover may compare the hash of the prover message received from the third-party with a hash of prover message and may generate a QPV action choice. The QPV action choice may signify whether the prover chooses to abort in a standard QKD protocol. The QPV action choice may indicate an abort if either the prover parameter estimation has failed or the hash received from the third-party and the computed hash of prover message do not match, indicating possible tampering in the communication channel.

In step 220, the third-party may send a position verification request to the first verifier and second verifier. This may include the claimed position, P.

In step 222, the verifiers may acknowledge the third-party request by returning a message to the third-party indicating such.

In step 224, the first and second verifiers may prepare for the protocol. For example, the first verifier may randomly generate two bitstrings, x' and y', as evaluation function inputs, and a random QPV bit value z for state preparation. The first verifier may send both bitstrings x' and y' to the second verifier using a secure communication channel. The first verifier may also inform the second verifier of the target time that bitstrings x' and y' should arrive at the claimed position. The first verifier may compute the time that it should send the first bitstring x' to the prover, and the second verifier may compute the time that it should send the second bitstring y' to the prover.

In step 226, the first verifier may prepare and send one or more quantum systems to the prover. A quantum system is a system that behaves according to the principles of quantum mechanics. A quantum system can be prepared in a quantum state, and its properties can be measured by a quantum measurement device. A quantum state has unique properties not observed in classical states, such as quantum superposition, interference, and entanglement.

For example, the quantum system may be sent to the prover over a communication channel that supports quantum communications, such as a fiber optic. The quantum system may be sent as multiple photons.

For example, the first verifier may compute the basis, θ, from the evaluation function using the bitstrings, θ=f(x', y'), and may prepare a quantum system Q with the computed basis and the QPV bit value z. The quantum system may be prepared in the BB84 state. The quantum system may then be sent to the prover via a quantum channel such that it arrives before messages from the first verifier and the second verifier.

In step 228, the prover may receive the quantum system and may reply to the first verifier if the quantum system has arrived. The prover may keep the quantum system in its quantum memory. An example of a suitable quantum memory is a delay line.

For example, the prover may perform a measurement to check if the quantum system has been received. The prover records that the quantum system has been received if there is a successful detection, otherwise, it records that the quantum system is lost. The prover informs both verifiers immediately/quickly whether the quantum system is received or is lost.

In step 230, the first verifier may send the first bitstring x', to the prover via a communication channel supporting one-way authentication, and the second verifier may send the second bitstring y', to the prover via a communication channel supporting one-way authentication using the agreed-upon timing.

In step 232, if the QPV action choice is not set to abort, in step 234, the prover may measure the quantum system and may record the measurement outcome. For example, the prover may measure the quantum system with the first bitstring x' and the second bitstring y', and may send responses to the first verifier and the second verifier with the measurement outcome immediately.

For example, the prover may compute the basis using the evaluation function and the two bitstrings $\theta=f(x', y')$. It may measure the quantum system Q in the computed basis $\theta$, and may record the measurement outcome.

If no detection is made, the prover may send a "no detection" message to the first verifier and the second verifier immediately/quickly.

If the QPV action is set to abort, in step 236, the prover may send a random bit value to the verifiers. Because a random bit value is sent, this may result in the QPV process failing.

If, in step 238, additional rounds are needed, the process may return to step 224.

If additional rounds are not needed, in step 240, the first verifier and the second verifier may validate the response that they received, and may verify that the responses were received within expected time window(s). The expected time window(s) may be based on the distance between the verifiers and the claimed location of the prover, P, and may differ.

For example, for every step of the protocol, the verifiers may check (1) that the responses received by the two verifiers match, (2) the responses match the detection response, and (3) the responses fall within some predetermined timing range. Furthermore, the verifiers may compute a loss rate and error rate from the prover's response and QPV bit values. The verifiers may further check if (4) the loss rate is within some tolerance range and (5) the error rate is within some tolerance range. If all checks pass, the verifiers may set QPV indicator $I_{QPV}$, to a first value (e.g., 1); otherwise, the QPV indicator may be set to a second value (e.g., 0).

In step 242, the first verifier may send the QPV indicator to the third-party. If, in step 244, the QPV indicator indicates failure, in step 246, the QPV verification may fail.

If the QPV indicator does not indicate authentication failure, in step 248, the third-party may inform the prover that the verification passed, and in step 250, the prover may perform privacy amplification on prover corrected key to obtain prover secret key and the third-party may perform privacy amplification on third-party corrected key to obtain third-party secret key.

In one embodiment, the privacy amplification may be performed using a quantum-proof strong extractor. For example, the third-party may send a randomly chosen extractor seed to the prover via a communication channel supporting one-way authentication. The third-party may use a quantum-proof strong extractor with an extractor seed and the third-party corrected key as inputs to compute a third-party secret key. The prover may use a quantum-proof strong extractor with an extractor seed and corrected prover key as inputs to compute a prover secret key.

Figure 3:
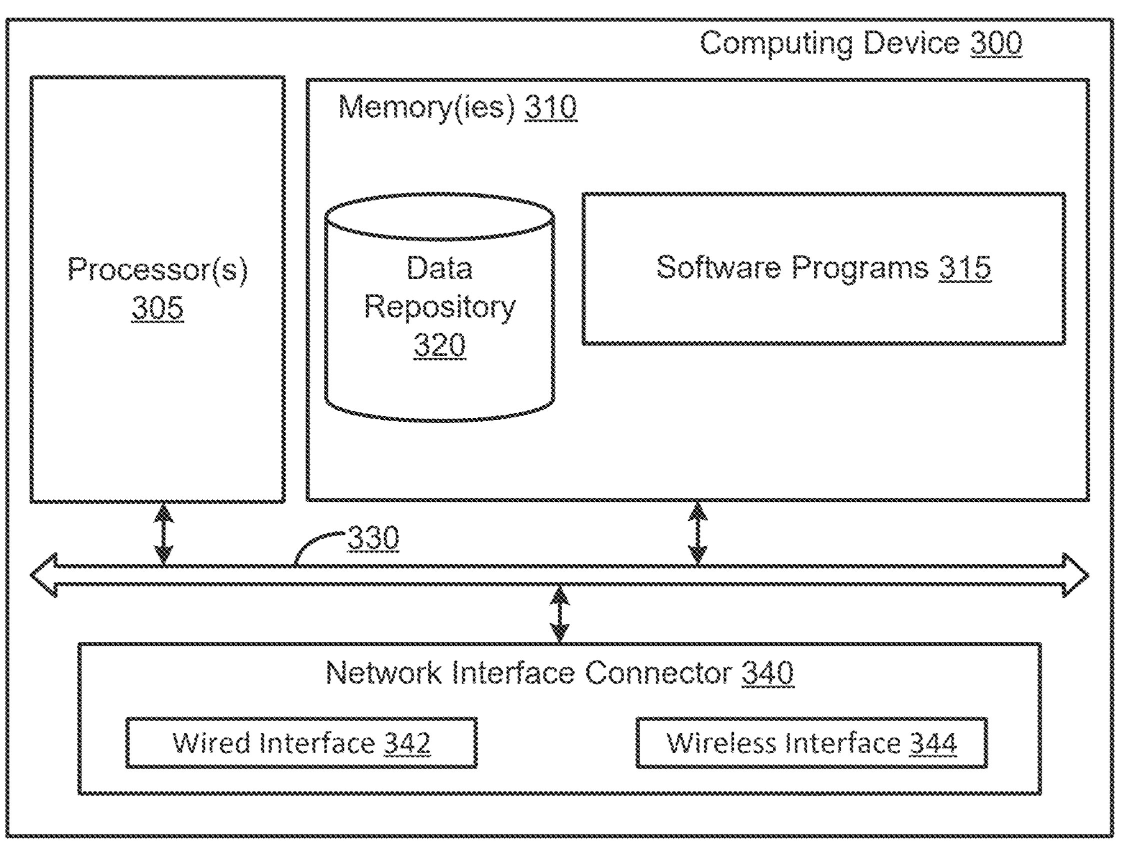
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

receiving, by a third-party electronic device, a claimed position from a prover electronic device;

exchanging, by the third-party electronic device and the prover electronic device, quantum information;

generating, by the third-party electronic device, a third-party raw key based on the quantum information;

generating, by the prover electronic device, a prover raw key based on the quantum information;

performing, by the third-party electronic device and the prover electronic device, classical post-processing based on the third-party raw key and the prover raw key;

sending, by the third-party electronic device, a position verification request with the claimed position to a first verifier electronic device and a second verifier electronic device;

sending, by the first verifier electronic device and the second verifier electronic device, classical messages and a quantum system to the prover electronic device to arrive at a target time;

measuring, by the prover electronic device, the quantum system using the classical messages;

sending, by the prover electronic device, responses to the first verifier electronic device and the second verifier electronic device;

validating, by the first verifier electronic device and the second verifier electronic device, the responses and confirming that the responses were received within an expected time window; and informing, by the first verifier electronic device, the third-party electronic device, of a result of the validation.

2. The method of claim 1, wherein the step of exchanging, by the third-party electronic device and the prover electronic device, quantum information comprises:

preparing, by the third-party electronic device and using a third-party quantum device, a plurality of first quantum systems using a quantum key distribution (QKD) basis choice;

sending, by the third-party electronic device, the plurality of first quantum systems to the prover electronic device; and measuring, by the prover electronic device and using a prover quantum device, the plurality of first quantum systems using a prover basis choice.

3. The method of claim 1, wherein the step of performing, by the third-party electronic device and the prover electronic device, classical post-processing based on the third-party raw key and the prover raw key comprises:

sending, by the prover electronic device, a prover classical message to the third-party electronic device;

sending, by the third-party electronic device, a third-party classical message to the prover electronic device;

performing, by the third-party electronic device and the prover electronic device, sifting, error correction, and parameter estimation based on the prover classical message and the third-party classical message;

sending, by the third-party electronic device, a hash of the prover classical message; and generating, by the prover electronic device, a quantum position verification (QPV) action choice, wherein the QPV action choice is based on the hash of the prover classical message being correct.

4. The method of claim 1, further comprising:

generating, by the third-party electronic device, a third-party QKD indicator, wherein the third-party QKD indicator indicates whether a key exchange will fail; and sending, by the third-party electronic device, the third-party QKD indicator to the prover electronic device.

5. The method of claim 3, wherein the step of sending, by the first verifier electronic device and the second verifier electronic device, classical messages and a quantum system to the prover electronic device to arrive at a target time comprises:

generating, by the first verifier electronic device, a first bitstring, a second bitstring;

sending, the first verifier electronic device, the first bitstring, the second bitstring, and the target time to a second verifier electronic device;

preparing, by the first verifier electronic device, the quantum system;

sending, by the first verifier electronic device, the quantum system to the prover electronic device; and sending, by the second verifier electronic device, the second bitstring to the prover electronic device, wherein the first bitstring and the second bitstring are sent to arrive at the claimed position at the target time.

6. The method of claim 5, wherein the step of measuring, by the prover electronic device, the quantum system using the classical messages comprises:

measuring, by the prover electronic device, the quantum system using the first bitstring and the second bitstring, resulting in measurement outcomes; and returning, by the prover electronic device, the measurement outcomes to the first verifier electronic device and the second verifier electronic device.

7. The method of claim 6, wherein the measurement outcomes comprise a random bit value in response to the QPV action choice indicating that the hash of the prover classical message is incorrect.

8. The method of claim 1, wherein the expected time window is based on the claimed position of the prover electronic device.

9. The method of claim 1, wherein the validation fails in response to the response being invalid or the response being received outside of the expected time window.

10. The method of claim 1, further comprising:

performing, by the prover electronic device and the third-party electronic device, privacy amplification, resulting in a prover secret key and a third-party secret key.

11. A system, comprising:

a first verifier electronic device executing a first verifier computer program;

a second verifier electronic device executing a second verifier computer program;

a prover electronic device executing a prover computer program; and a third-party electronic device executing a third-party computer program;

wherein:

the third-party computer program is configured to receive a claimed position from a prover computer program;

the third-party computer program and the prover computer program are configured to exchange quantum information;

the third-party computer program is configured to generate a third-party raw key based on the quantum information;

the prover computer program is configured to generate a prover raw key based on the quantum information;

the third-party computer program and the prover computer program are configured to perform classical post-processing based on the third-party raw key and the prover raw key;

the third-party computer program is configured to send a position verification request with the claimed position to the first verifier computer program and the second verifier computer program;

the first verifier computer program and the second verifier computer program are configured to send classical messages and a quantum system to the prover computer program to arrive at a target time;

the prover computer program is configured to measure the quantum system using the classical messages;

the prover computer program is configured to send responses to the first verifier computer program and the second verifier computer program;

the first verifier computer program and the second verifier computer program are configured to validate the responses and confirming that the responses were received within an expected time window; and the first verifier computer program is configured to inform the third-party computer program of a result of the validation.

12. The system of claim 11, wherein the third-party computer program and the prover computer program are configured to exchange quantum information by:

the third-party computer program preparing, using a third-party quantum device, a plurality of first quantum systems using a quantum key distribution (QKD) basis choice;

the third-party computer program sending the plurality of first quantum systems to the prover computer program; and the prover computer program measuring, and using a prover quantum device, the plurality of first quantum systems using a prover basis choice.

13. The system of claim 11, wherein the third-party computer program and the prover computer program are configured to perform classical post-processing based on the third-party raw key and the prover raw key by:

the prover computer program sending a prover classical message to the third-party computer program;

the third-party computer program sending a third-party classical message to the prover computer program;

the third-party computer program and the prover computer program performing sifting, error correction, and parameter estimation based on the prover classical message and the third-party classical message;

the third-party computer program sending a hash of the prover classical message; and the prover computer program generating a quantum position verification (QPV) action choice, wherein the QPV action choice is based on the hash of the prover classical message being correct.

14. The system of claim 11, wherein:

the third-party computer program is configured to generate a third-party QKD indicator, wherein the third-party QKD indicator indicates whether a key exchange will fail; and the third-party computer program is configured to send the third-party QKD indicator to the prover computer program.

15. The system of claim 13, wherein the first verifier computer program and the second verifier computer program are configured to send the classical messages and the quantum system to the prover computer program to arrive at a target time by:

the first verifier computer program generating a first bitstring, a second bitstring;

the first verifier computer program sending the first bitstring, the second bitstring, and the target time to the second verifier computer program;

the first verifier computer program preparing the quantum system;

the first verifier computer program sending the quantum system to the prover computer program; and the second verifier computer program sending the second bitstring to the prover computer program, wherein the first bitstring and the second bitstring are sent to arrive at the claimed position at the target time.

16. The system of claim 15, wherein the prover computer program is configured to measure the quantum system using the classical messages by:

the prover computer program measuring the quantum system using the first bitstring and the second bitstring, resulting in measurement outcomes; and the prover computer program returning the measurement outcomes to the first verifier computer program and the second verifier computer program.

17. The system of claim 16, wherein the measurement outcomes comprise a random bit value in response to the QPV action choice indicating that the hash of the prover classical message is incorrect.

18. The system of claim 11, wherein the expected time window is based on the claimed position of the prover computer program.

19. The system of claim 11, wherein the validation fails in response to the response being invalid or the response being received outside of the expected time window.

20. The system of claim 11, wherein:

the prover computer program and the third-party computer program are configured to perform privacy amplification, resulting in a prover secret key and a third-party secret key.

* * * * *